(12) United States Patent
Lin

(10) Patent No.: US 11,037,521 B1
(45) Date of Patent: Jun. 15, 2021

(54) METHOD OF LOSSLESS TRANSMISSION FOR 4K MULTIMEDIA

(71) Applicant: YUAN High-Tech Development Co., Ltd., Taipei (TW)

(72) Inventor: Hueng-Pei Lin, New Taipei (TW)

(73) Assignee: YUAN High-Tech Development Co., Ltd., Taipei (TW)

( * ) Notice: Subject to any disclaimer, the term of this patent is extended or adjusted under 35 U.S.C. 154(b) by 0 days.

(21) Appl. No.: 16/817,806

(22) Filed: Mar. 13, 2020

(30) Foreign Application Priority Data

Feb. 21, 2020 (TW) .................................. 109105665

(51) Int. Cl.
*G06F 13/14* (2006.01)
*G09G 5/00* (2006.01)
*G06F 13/42* (2006.01)

(52) U.S. Cl.
CPC .......... *G09G 5/006* (2013.01); *G06F 13/4282* (2013.01); *G06F 2213/0026* (2013.01); *G09G 2340/02* (2013.01); *G09G 2370/00* (2013.01)

(58) Field of Classification Search
CPC .......... G06F 3/14; G09G 5/363; G09G 5/006; G09G 1/001; G06T 1/20
USPC ....................................................... 345/520
See application file for complete search history.

(56) References Cited

U.S. PATENT DOCUMENTS

| 2015/0093015 A1* | 4/2015 | Liang ................... G06K 9/6267 382/154 |
| 2018/0333645 A1* | 11/2018 | Daly, Jr. .......... H04N 21/43632 |
| 2018/0336159 A1* | 11/2018 | Kung .................. G06F 13/4282 |
| 2019/0045236 A1* | 2/2019 | Kambhatla ........ H04N 21/4622 |

* cited by examiner

*Primary Examiner* — Gordon G Liu
(74) *Attorney, Agent, or Firm* — Demian K. Jackson; Jackson IPG PLLC

(57) ABSTRACT

A method is provided for lossless transmission. Super-resolution image data are processed. The image data are transferred in a super-resolution mode to a super-resolution receiver. After being received, the image data are sequentially transferred to a lossless compressor and a PCI-E converter for lossless compression and PCI-E conversion. Thus, compressed image data are generated. Through an interface connector, the compressed image data are transferred in the same mode with the same specifications to a receiving terminal. After being received, the compressed image data are transferred to a driver to be decompressed and displayed on a display. Consequently, a data-collecting device can be fabricated. Therein, after original image data are processed through lossless compression, original image quality can be restored through decompression; the lossless image data are outputted and displayed at the receiving terminal; and the resolution and quality of displayed image are manifested with the original specifications.

8 Claims, 3 Drawing Sheets

METHOD OF LOSSLESS TRANSMISSION FOR 4K MULTIMEDIA

TECHNICAL FIELD OF THE INVENTION

The present invention relates to 4K multimedia transmission; more particularly, to a 4K/60 fps (four times the 1080 pixel resolution for 60 frames per second) data-collecting device, where the resolution and quality of displayed image are manifested with original lossless 4K/60 fps specifications.

DESCRIPTION OF THE RELATED ARTS

Digital video capability can be incorporated into a wide range of displays, including a digital television, a personal digital assistant, a desktop, a desktop monitor, a digital cameras, a digital recorder, a digital media player, a video game device, a video game console, a cellular/satellite radio telephone, a video teleconferencing device, and the like. A display link is used to connect a display to a proper source device. The required bandwidth of the display link is proportional to the resolution of the display. Therefore, a high-resolution display requires a wide bandwidth for the display link. Yet, some displays do not have bandwidths to support the high-resolution display.

In prior arts, the amount of data would be compressed through compressing image data. Through reducing bandwidth request, a low-bandwidth display link can provide a digital video on a high-resolution display. Nevertheless, such kind of solution is not visually lossless sometimes, or practices are difficult and expensive for conventional displays. For example, image signals transferred through thunderbolt can only achieve a 4 k image quality of 55~58 fps. It leads to signal lose at a receiving end, which means data loss.

The ability to process information is still limited, what is displayed will be limited in terms of both image resolution and quality in particular.

Hence, the prior art does not fulfill all users' expectations on actual use.

SUMMARY OF THE INVENTION

The main purpose of the present invention is to fabricate a 4K/60 fps data-collecting device, where original super-resolution image data processed through lossless compression are decompressed to recover lossless super-resolution image data conforming to 4K/60 fps specifications for being outputted to a receiving terminal to be played; and the resolution and quality of displayed image are manifested with the original lossless 4K/60 fps specifications.

To achieve the above purpose, the present invention is a method of lossless transmission for 4K multimedia, comprising steps of: (a) first step: connecting a signal terminal to a multimedia processing device, where the signal terminal has a first port; obtaining super-resolution image data from the signal terminal; and outputting the super-resolution image data to the multimedia processing device in a super-resolution mode through the first port, where the super-resolution mode conforms to 4K/60 fps specifications; (b) second step: obtaining the multimedia processing device, where the multimedia processing device comprises a super-resolution receiver, a lossless compressor, a peripheral component interface express (PCI-E) converter, and an interface connector; connecting the super-resolution receiver to the first port; connecting the lossless compressor to the super-resolution receiver and the PCI-E converter; connecting the PCI-E converter to the interface connector; receiving the super-resolution image data by the super-resolution receiver to be transferred to the lossless compressor to be processed with a lossless treatment; changing interface to a PCI-E interface through the PCI-E converter to obtain compressed lossless image data; and outputting the compressed lossless image data through the interface connector in the super-resolution mode as conforming to the 4K/60 fps specifications; (c) third step: connecting to a receiving terminal, where the receiving terminal comprises a second port, a driver, and a playback unit; connecting the second port to the interface connector; and connecting the driver to the second port and the playback unit; and (d) fourth step: receiving the compressed lossless image data through the second port by the receiving terminal to be transferred to the driver; and recovering the super-resolution image data from the compressed lossless image data through decompression by the driver and driving the playback unit based on the super-resolution image data, where the compressed lossless image data are decompressed in the multimedia processing device to recover the super-resolution image data conforming to the 4K/60 fps specifications to be outputted to the receiving terminal to be played. Accordingly, a novel method of lossless transmission for 4K multimedia is obtained.

BRIEF DESCRIPTION OF THE DRAWINGS

The present invention will be better understood from the following detailed description of the preferred embodiment according to the present invention, taken in conjunction with the accompanying drawings, in which.

DESCRIPTION OF THE PREFERRED EMBODIMENT

The following description of the preferred embodiment is provided to understand the features and the structures of the present invention.

Figure 1:
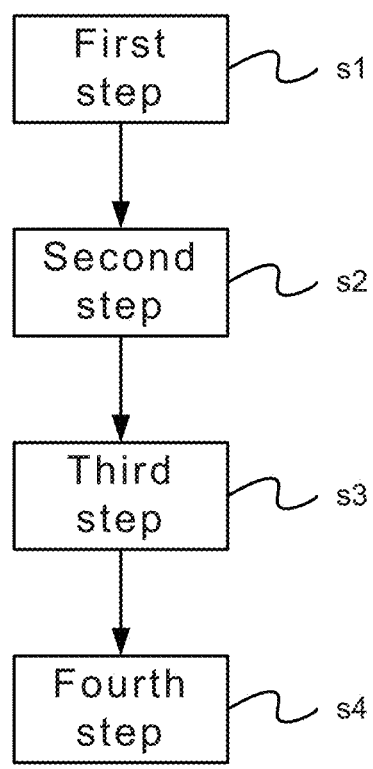
FIG. 1 is the flow view showing the preferred embodiment according to the present invention.
Figure 2:
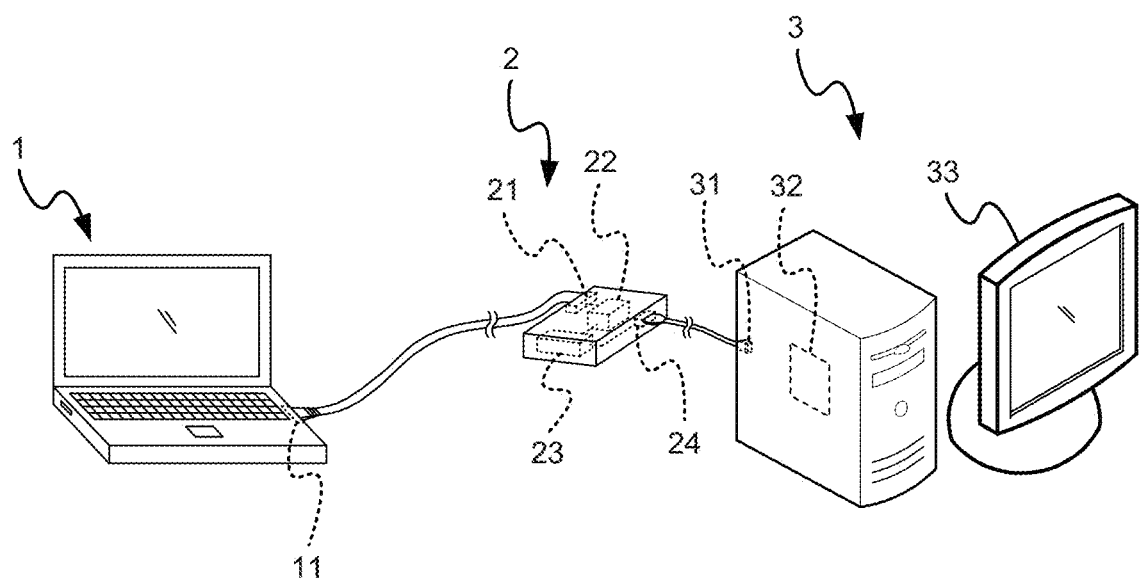
FIG. 2 is the view showing the devices used.
Figure 3:
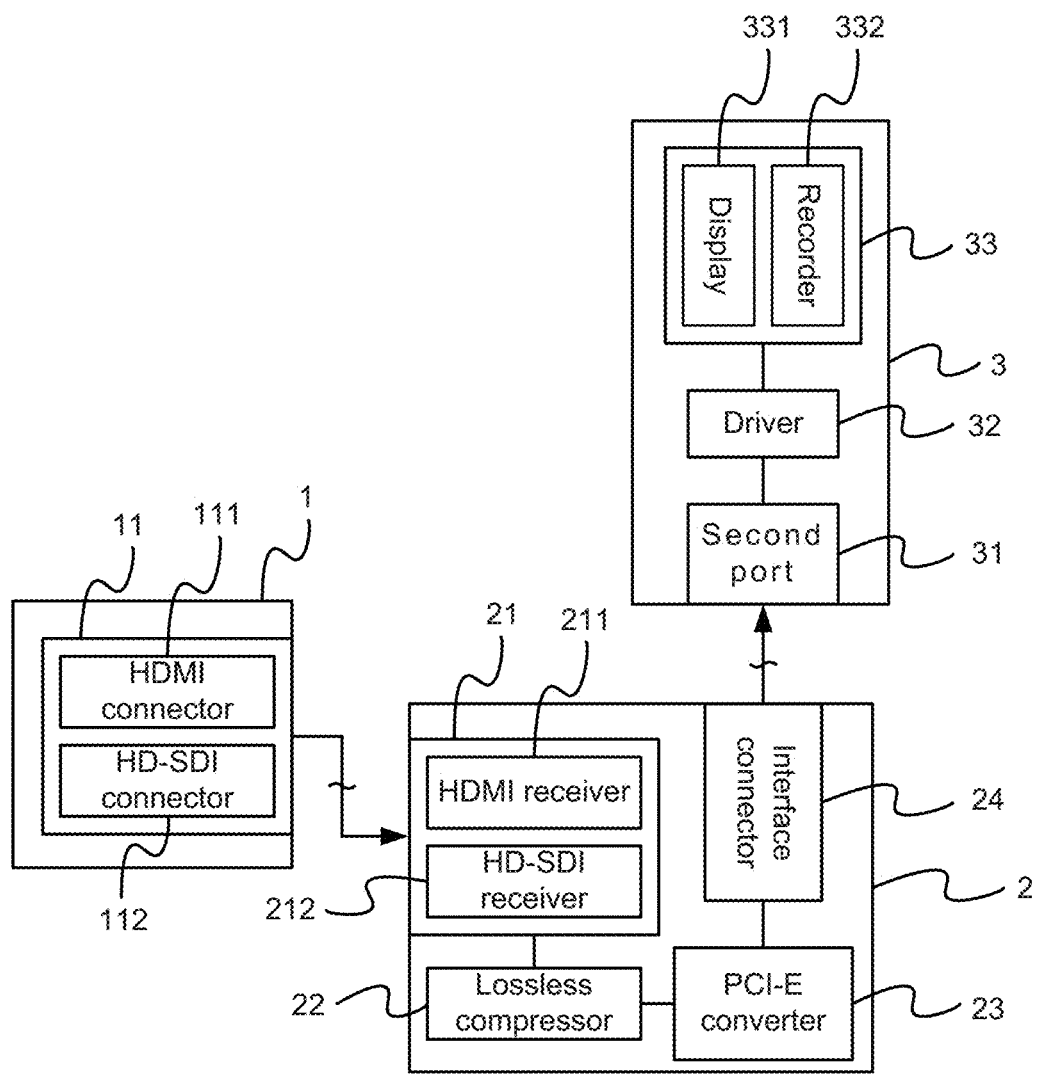
FIG. 3 is the block view.

Please refer to FIG. 1 to FIG. 3, which are a flow view showing a preferred embodiment according to the present invention; a view showing devices used; and a block view. As shown in the figures, the present invention is a method of lossless transmission for 4K (four times the 1080 pixel resolution) multimedia, which comprises the following steps:

(a) First step s1: A signal terminal 1 connects to a multimedia processing device 2. The signal terminal 1 has a first port 11. Super-resolution image data are provided by the signal terminal 1. The super-resolution image data are outputted to the multimedia processing device 2 in a super-resolution mode through the first port 11. The super-resolution mode conforms to 4K for 60 frames per second (fps) specifications.

(b) Second step s2: The multimedia processing device 2 is obtained, comprising a super-resolution receiver 21, a lossless compressor 22, a peripheral component interface express (PCI-E) converter 23, and an interface connector 24. The super-resolution receiver 21 connects to the first port 11. The lossless compressor 22 connects to the super-resolution receiver 21 and the PCI-E converter 23. The PCI-E converter 23 connects to the interface connector 24. The interface connector 24 is a thunderbolt (TB) connector. The super-resolution image data are received by the super-resolution receiver 21 of the multimedia process device 2 to be transferred to the lossless compressor 22 for being processed with a lossless treatment. Interface is changed to a PCI-E interface through the PCI-E converter 23 to generate compressed lossless image data. The compressed lossless image data are outputted through the interface connector 24 in the super-resolution mode as conforming to the 4K/60 fps specifications.

(c) Third step s3: A receiving terminal 3 is connected. The receiving terminal 3 comprises a second port 31, a driver 32, and a playback unit 33. The second port 31 connects to the interface connector 24. The driver 32 connects to the second port 31 and the playback unit 33.

(d) Fourth step s4: The compressed lossless image data are received through the second port 31 by the receiving terminal 3 to be transferred to the driver 32. The super-resolution image data are recovered from the compressed lossless image data through decompression by the driver 32 and the playback unit 33 is driven based on the super-resolution image data. Accordingly, the compressed lossless image data is decompressed in the multimedia processing device 2 to recover the super-resolution image data conforming to the 4K/60 fps specifications for being outputted to the receiving terminal 3 to be played.

Thus, a novel method of lossless transmission for 4K multimedia is obtained.

On using the present invention, the super-resolution image data conforming to the 4K/60 fps specifications are processed at the signal terminal 1. The super-resolution image data are transferred through the first port 11 in the super-resolution mode to the super-resolution receiver 21 of the multimedia processing device 2. After being received, the super-resolution image data are sequentially transferred to the lossless compressor 22 and the PCI-E converter 23. The super-resolution image data are processed through lossless treatment and PCI-E conversion to generate the compressed lossless image data. The compressed lossless image data are outputted through the interface connector 24 in the super-resolution mode to the second port 31 of the receiving terminal 3 as conforming to the 4K/60 fps specifications. After being received, the compressed lossless image data are transferred to the driver 32. The driver 32 decompresses the compressed lossless image data to be displayed on the playback unit 33 for playback. Thus, a 4K/60 fps data-collecting device can be fabricated by using the present invention, where the original super-resolution image data processed through lossless compression are decompressed to recover the lossless super-resolution image data conforming to the 4K/60 fps specifications for being outputted to the receiving terminal 3 for playback; and the resolution and quality of the displayed image can be manifested with the original lossless 4K/60 fps specifications.

In a state-of-use, each of the signal terminal 1 and the receiving terminal 3 is a digital television, a personal digital assistant, a notebook, a desktop, a tablet, a digital camera, a digital recorder, a digital media player, a video game device, a video game console, a cellular/satellite radio telephone, or a video teleconferencing device. Thus, digital video capability is incorporated into a wide range of devices.

In a state-of-use, the first port 11 comprises a high definition multimedia interface (HDMI) connector 111 and a high definition serial digital interface (HD-SDI) connector 112. The super-resolution receiver 21 comprises an HDMI receiver 211 and an HD-SDI receiver 212. Thus, the resolution of image signal is improved to meet actual requests.

In a state-of-use, the playback unit 33 comprises a display 331 and a recorder 332. Thus, the compressed lossless image data processed by the multimedia processing device are decompressed to recover the lossless super-resolution image data conforming to the 4K/60 fps specifications for being displayed on the display 331 of the receiving terminal 3 for playback, or deliver to the recorder 332 of the receiving terminal 3 to be recorded.

To sum up, the present invention is a method of lossless transmission for 4K multimedia, where a 4K/60 fps data-collecting device is fabricated; original super-resolution image data processed through lossless compression are decompressed to recover lossless super-resolution image data conforming to 4K/60 fps specifications for being outputted to a receiving terminal for playback; and, thus, the resolution and quality of displayed image can be manifested with the original lossless 4K/60 fps specifications.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A method of lossless transmission for 4K (four times a pixel resolution of 1080p) multimedia comprising steps of:
    connecting a signal terminal having a first port to a multimedia processing device comprising a receiver, a lossless compressor, a peripheral component interface express (PCI-E) converter, and an interface connector;
    obtaining image data from said signal terminal;
    outputting said image data to said multimedia processing device through said first port conforming to 4K for 60 frames per second (fps) specifications;
    connecting said receiver to said first port;
    connecting said lossless compressor to said receiver and said PCI-E converter;
    connecting said PCI-E converter to said interface connector;
    receiving said image data by said receiver to be transferred to said lossless compressor to be processed with a lossless treatment;
    changing interface to a PCI-E interface through said PCI-E converter to obtain compressed lossless image data;
    outputting said compressed lossless image data through said interface connector conforming to said 4K/60 fps specifications;
    connecting to a receiving terminal comprising a second port, a driver, and a playback unit by connecting said second port to said interface connector and connecting said driver to said second port and said playback unit;
    receiving said compressed lossless image data through said second port by said receiving terminal to be transferred to said driver; and
    recovering said image data from said compressed lossless image data through decompression by said driver and driving said playback unit based on said image data, wherein said compressed lossless image data are decompressed in said multimedia processing device to recover said image data conforming to said 4K/60 fps specifications to be outputted to said receiving terminal to be played.

2. The method according to claim 1, wherein said signal terminal is selected from a group consisting of a digital television, a personal digital assistant, a notebook, a desktop, a tablet, a digital cameras, a digital recorder, a digital media player, a video game device, a video game console, a cellular/satellite radio telephone, and a video teleconferencing device.

3. The method according to claim 1, wherein said first port comprises a high definition multimedia interface (HDMI) connector and a high definition serial digital interface (HD-SDI) connector.

4. The method according to claim 1, wherein said receiver comprises an HDMI receiver and an HD-SDI receiver.

5. The method according to claim 1, wherein said interface connector is a thunderbolt (TB) connector.

6. The method according to claim 1, wherein said receiving terminal is selected from a group consisting of a digital television, a personal digital assistant, a notebook, a desktop, a tablet, a digital cameras, a digital recorder, a digital media player, and a video game device.

7. The method according to claim 1, wherein said playback unit comprises a display and a recorder.

8. The method according to claim 1, wherein said receiving terminal is selected from a group consisting of a video game console, a cellular/satellite radio telephone, and a video teleconferencing device.

* * * * *